March 14, 1950
L. K. BEACH
2,500,736
METHOD OF SEPARATING A DIOLEFIN
FROM A MONOOLEFIN
Filed Jan. 4, 1947
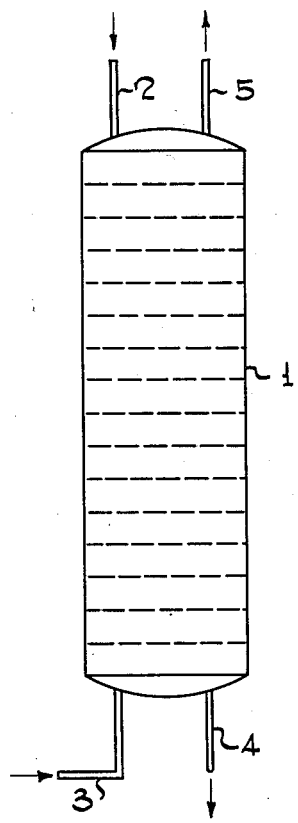
Leland K. Beach Inventor
By J. C. Small Attorney Patented Mar. 14, 1950                                      2,500,736

UNITED STATES PATENT OFFICE 2,500,736

METHOD OF SEPARATING A DIOLEFIN FROM A MONOOLEFIN

Leland K. Beach, Mountainside, N. J., assignor to Standard Oil Development Company, a corporation of Delaware Application January 4, 1947, Serial No. 720,244

7 Claims. (Cl. 260—677)

This invention relates to improvements in alkylation and particularly to the removal of diolefins from alkylation feeds.

Mono-olefins are used in the alkylation of hydrocarbons, both of the paraffins and the aromatics. Most hydrocarbon mixtures containing the desired mono-olefins that are used in alkylation contain diolefins that introduce serious complications during alkylation and are generally separated. The diolefins may be removed by first reacting with an absorbent, such as a cuprous salt with which addition compounds of the diolefins are formed, the mono-olefins may then be selectively separated from the absorbent. These processes require absorption towers and a series of desorber towers and it is not commercially feasible where only small fractions of diolefins are present. The fractionation of a hydrocarbon mixture composed of mono-olefins and diolefins is likewise very difficult as the boiling points of these compounds are relatively close to each other varying only within a few degrees. A number of towers with extensive refluxing is necessary in order to separate by distillation the diolefin from the mono-olefins.

According to this invention, it has been found that the diolefins may be readily separated from the mono-olefins by the use of phenolic compounds and a nuclear condensation catalyst such as sulfonic acids, esters of sulfonic acid, sulfuric acid and other condensing agents.

Diolefins react irreversibly with phenols in the presence of acid catalyst. Tertiary olefins react reversibly, and at high temperatures their reverse reaction is favorable. Straight chain olefins (—C—C=C and —C—C=C—C—) react very slowly, although irreversibly. For example, isoprene reacts readily with cresol to form an irreversible or non-regeneratable product which does not react with tertiary amylenes. This is shown in the following table where cresols were reacted in runs 1 to 4 with different mixtures of liquid hydrocarbons having 5 carbon atoms to the molecule and containing from 5% to 47% diolefins and the resulting product regenerated:

TABLE

*Effect of isoprene on liquid phase alkylation of cresols by tertiary olefins*

| Run No. | 1 | 2 | 3 | 4 |
|---|---|---|---|---|
| Alkylation Conditions: | | | | |
| Temperature, °C | 60 | 60 | 60 | 60 |
| Time, Hours | 2 | 2 | 2 | 2 |
| $C_5$ Feed Mols/Mol of Cresol: | | | | |
| t-olefins | 0.96 | 1.05 | 0.0 | 0.50 |
| Diolefins | 0.34 | 0.35 | 0.80 | 0.06 |
| Inerts (e) | 0.85 | 0.92 | 0.90 | 0.44 |
| Cresol: | | | | |
| Saturation before Alkylation (mols combined $C_5$/mol Cresol) | 0.00(f) | 0.31(g) | 0.59(g) | 1.29(g) |
| Saturation after Alkylation | 0.62 | 0.76 | 1.29 | 1.35 |
| Saturation after Regeneration (a) | 0.31 | 0.59 | 1.29 | 1.35 |
| Mols t-Amylenes Regenerated per mol of Cresol | 0.31 | 0.17 | 0.00 | 0.00 |
| Percent Available Diolefins reacted with Cresol | 91 | 80 | 87 | 100 |
| Percent Available t-Amylenes Alkylated and Regenerated | 32 | 16 |  | 0 |
| Catalyst Mol percent on Cresol (c): | | | | |
| before Alkylation | 0.50 | 0.44 | 0.39 | 0.29(b) |
| after Regeneration | 0.44 |  |  |  |

(a) Batch regeneration completed in 1.0 hrs. max. temp. 210° C.
(b) Batch regeneration heated over 250° C.
(c) Toluenesulfonic acid.
(e) n-Olefins and saturates.
(f) Fresh mp-Cresols.
(g) The cresol used in this run is recovered cresol from the preceding run after regeneration at 210° C. Thus the indicated amount of combined $C_5$ is due to reaction with diolefins, an effect which is evidently cumulative.

After successive cycles of reaction with diolefins and regeneration, the capacity of these cresols for alkylating and regenerating t-amylenes dropped. When a cumulative large excess of diolefins was combined with the cresol in run 3, the capacity for t-amylenes was completely destroyed (run 4). The final isoprene-cresol reaction product from run 4 was not regenerated when distilled.

The gaseous mixture of saturates and unsaturates containing diolefins when contacted with a phenolic material and catalyst at 50° to 250° C. for 1 to 120 seconds at 30 to 0 pounds per square inch gauge or less pressure results in the irreversible removal of the diolefin from the mixture. The phenol and diolefin react irreversibly to form a stable compound.

The wide range of operating temperatures allows a mixture essentially free of t-olefins to be treated at 50 to 150° C. and suitable pressure and contact time, under which conditions the other olefins are unreactive during diolefin removal. Such a case would be the treatment of a spent n-butene off-gas from a butadiene extraction plant operated in connection with an n-butene dehydrogenation unit. By this method it would be possible not only to remove undesirable diolefins from an n-olefin feed, but also at the same time to remove traces of undesirable tertiary olefins.

However, in the presence of a tertiary olefin temperatures of 150° C. to 250° C. must be used so that the tertiary olefins will not react during diolefin removal. Such a case would be the treatment of most unsaturated cuts used for alkylation feed.

EXAMPLE 1

Two barrels of a thermally cracked C₅ cut containing saturates and olefins including 13.9% t-olefins and 2% diolefins was passed in the gas phase through a 12 plate tower containing mixed cresols catalyzed with 0.5 mol per cent phenol-sulfonic acid. A temperature of about 190° C. at atmospheric pressure was maintained. The recovered treated gas contained substantially the original t-olefin concentration but no diolefin.

EXAMPLE 2

A C₅ cut containing 55% t-olefins and 15% diolefins was treated two hours in the liquid phase at about 60° C. in a pressure bomb at a pressure of about 30 pounds per square inch gauge with one mol of mixed cresols containing 0.5 mol per cent benzene-sulfonic acid. The hydrocarbons recovered from the mixture under atmospheric pressure contained no diolefins.

This method has advantages over the clay treating method for removing diolefins. First the tertiary olefins are not affected in the least by the phenol process, whereas in clay treating, a significant loss of tertiary olefins may result. In the clay treating process the polymerized products last on the clay whereas in the phenol process the product of diolefin and phenol, because of its increased solubility in hydrocarbons, will find a ready market as an inhibitor, preservative, etc.

The accompanying drawing illustrates diagrammatically an elevational view of a suitable apparatus for conducting the process.

The invention will be more fully understood by referring to the accompanying drawing in which is shown a packed tower 1 into which is passed a mixture of meta and para cresols containing 0.5 mol per cent phenol sulphonic acid by means of pipe 2. Into the bottom of the tower is passed a C₅ mixture containing diolefins and tertiary mono-olefins by means of pipe 3. A temperature ranging from 150 to 250° C. is maintained in the packed tower 1 by means not shown.

From the bottom of the tower is withdrawn spent cresols containing the absorbed diolefins by means of pipe 4, and from the top of the tower, by means of pipe 5, is withdrawn a mixture of C₅ hydrocarbons free of diolefins and containing tertiary mono-olefins which may be used as an alkylation feed.

I claim:

1. The method of separating a diolefin from a mono-olefin in a mixture thereof, which comprises contacting the mixture with a liquid phenolic compound in the presence of an acid condensing catalyst selected from the group consisting of sulfuric acid and a sulfonic acid; at an elevated temperature of from 50° to 250° C. suitable for bringing about reaction of the diolefin with the phenolic compound and leaving the mono-olefin unreacted, then separating the unreacted mono-olefin in gaseous phase from the resulting reaction mixture containing the diolefin combined with the phenolic compound.

2. The improvement in the preparation of a mono-olefin feed for alkylation which comprises contacting a gaseous mixture containing mono-olefins and diolefins with a sufficient amount of liquid phenols in the presence of an acid condensing catalyst selected from the group consisting of sulfuric acid and a sulfonic acid at a temperature ranging from about 50 to 250° C., and at a pressure of 0 to 30 lbs. per square inch gauge for sufficient time to mainly react substantially all the diolefins with the phenols in forming stable compounds of the diolefins combined with the phenolic compound, and removing from the resulting reaction mixture containing said stable compounds the mono-olefins in gaseous phase thus freed of the diolefins.

3. The improvement in separating a diolefin from a tertiary mono-olefin which comprises passing a mixture of the mono-olefin and diolefin into contact with a liquid phenolic compound in the presence of a sulfonic acid condensing catalyst at a temperature ranging from 150° to 250° C., and at a pressure of 0 to 30 lbs. per square inch gauge until the diolefin is combined with the phenolic compound in the formation of a stable compound thereof, and separating the unreacted mono-olefin in gaseous phase from the resulting reaction mixture containing said stable compound in which the diolefin is combined with the phenolic compound.

4. Improvement in separating a diolefin from a normal mono-olefin which comprises contacting a mixture thereof with a liquid phenolic compound in the presence of a sulfonic acid condensing catalyst at a temperature ranging from 50 to 150° C. and at a pressure of 0 to 30 lbs. per square inch gauge for a period of 1 to 120 minutes until the diolefin is reacted with the phenolic compound to form a stable compound therewith, and separating unreacted mono-olefin from the resulting reaction mixture that contains any unreacted liquid phenolic compound, the condensing catalyst and the stable compound of the diolefin combined with the phenolic compound.

5. In the separation of a mono-olefin from a diolefin in a mixture thereof, the improvement which comprises contacting the mixture with a liquid phenolic compound in the presence of a sulfonic acid condensing catalyst at a temperature within the range of 50 to 250° C. until the diolefin is reacted with the phenolic compound to form a stable compound therewith while maintaining a pressure of 0 to 30 lbs. per square inch gauge and separating the unreacted mono-olefin from the resulting liquid reaction mixture containing the diolefin combined with the phenolic compound.

6. In the separation of tertiary amylene from a hydrocarbon mixture containing isoprene, the improvement which comprises passing said mixture into contact with a liquid mixture of meta and para cresols with 0.1 to 1.0 mol % of benzene sulfonic acid, maintaining the contacted mixtures at a temperature ranging from 150 to 250° C. and under a pressure of 0 to 30 lbs. per square inch gauge, until the isoprene is reacted with the cresols in combining therewith to form stable compounds and separating unreacted tertiary amylene from the resulting reaction mixtures that contain said stable compounds.

7. In the separation process described in claim 6 contacting said mixture of isoprene and tertiary amylene in the gaseous phase with the liquid mixture of meta and para cresols maintained at a temperature ranging from 150 to 250° C., limiting the time of contact from 1 to 60 seconds, and recovering the gaseous tertiary amylene freed of the isoprene from the resulting reaction mixture.

LELAND K. BEACH.

REFERENCES CITED

The following references are of record in the file of this patent:

UNITED STATES PATENTS

| Number | Name | Date |
|---|---|---|
| 2,001,634 | Stevens et al. | May 14, 1935 |
| 2,035,102 | Stratford et al. | Mar. 24, 1936 |
| 2,061,583 | Malisoff et al. | Nov. 24, 1936 |
| 2,265,583 | Stevens et al. | Dec. 9, 1941 |
| 2,283,465 | Schaad | May 19, 1942 |
| 2,370,810 | Morrell et al. | Mar. 6, 1945 |